Sept. 29, 1942.    E. L. TRIMAN ET AL    2,297,085
PHONOGRAPH
Filed July 14, 1941    8 Sheets-Sheet 2

Sept. 29, 1942.  E. L. TRIMAN ET AL  2,297,085
PHONOGRAPH
Filed July 14, 1941  8 Sheets-Sheet 5

Inventors.
Eugene L. Triman
Lawrence E. Dettle
BY
Sheridan, Davis & Cargill
Attys.

Inventors.
Eugene L. Triman
Lawrence F. Dettle

Patented Sept. 29, 1942

2,297,085

UNITED STATES PATENT OFFICE 2,297,085

PHONOGRAPH

Eugene L. Triman and Lawrence E. Dettle, Chicago, Ill., assignors to Rock-Ola Manufacturing Corporation, Chicago, Ill., a corporation of Delaware Application July 14, 1941, Serial No. 402,310

27 Claims. (Cl. 179—6)

Our invention relates to phonographs, and more particularly to a coin-controlled phonograph system comprising a central station and a plurality of subscribers' stations.

Heretofore automatic phonographs were limited to the playing of a relatively small number of phonograph records. More recently, automatic phonographs have been provided with a larger number of records and with means for selectively playing any record or each of a plurality of records. These phonographs have also frequently been provided with means for remotely controlling the selection and operation of such phonographs. Although the number of phonograph records or selections now available on automatic phonographs is considerably greater than it has been in the past, it would be desirable if a still larger number of phonograph records were available or if it were possible to provide an extensive repertoire of selections or a library of phonograph records. This would be possible if a phonograph system were provided whereby a library of phonograph records were available at a central station which would serve a number of subscribers' stations. It furthermore would be desirable if such a system could be provided for use in conjunction with the present automatic phonographs.

It is, therefore, an object of our invention to provide an improved system for electrically reproducing phonograph records.

Still another object of our invention is to provide a phonograph system having a new and improved coin-controlled circuit arrangement for transmitting impulses from a subscriber station to a central station, the impulses corresponding to the value of the coins received at the subscriber station.

Still another object of our invention is to provide an improved phonograph system having a circuit arranged for receiving and indicating impulses at the central station.

Still another object of our invention is to provide an improved phonograph system for electrically reproducing phonograph records which is provided with coin-controlled means for controlling the effectiveness of one of the elements of the apparatus for reproducing phonograph records.

A further object of our invention is to provide an improved phonograph system for electrically reproducing phonograph records having a new and improved circuit for insuring the positive operation of a relay controlling the connection of a telephone line to certain apparatus at the subscriber station.

A still further object of our invention is to provide an improved phonograph system for electrically reproducing phonograph records which may be utilized in conjunction with the present automatic phonographs.

Other and further objects of our invention will become more readily apparent from the following description taken in connection with the accompanying drawings in which.

Figures 1, 5:
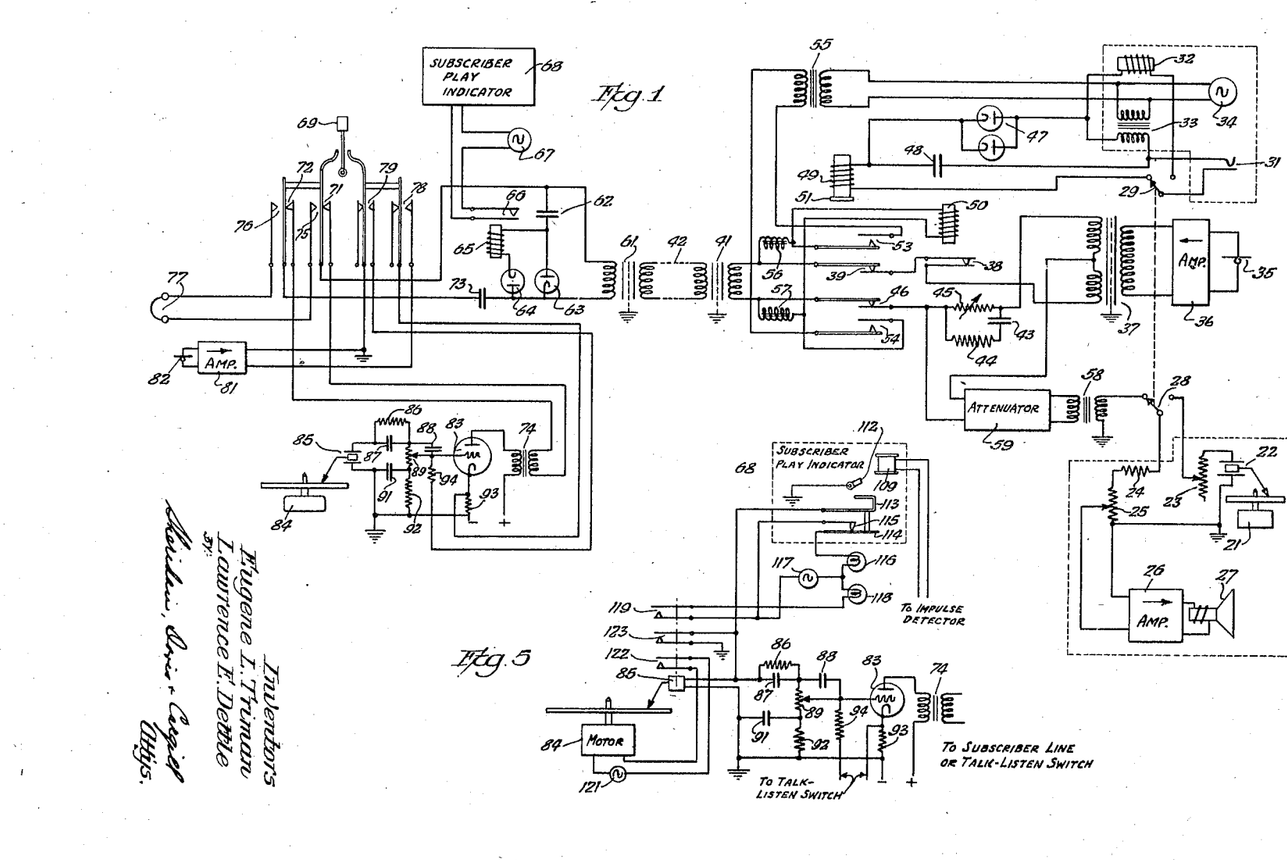
Fig. 1 is a circuit arrangement for electrically reproducing phonograph records in accordance with our invention, and which comprises a single channel system as utilized between one subscriber and the central station.
Fig. 5 illustrates a detail of the control and signal circuits located at the central station.

Referring more particularly to Fig. 1, there is shown therein the circuit arrangement utilized between each subscriber station and the central station and which is termed a single channel system. A single pair of telephone lines interconnects the subscriber with the central station. Since it would be desirable to provide a larger number of available phonograph records, particularly in conjunction with existing automatic phonographs, certain elements shown in Fig. 1 have been enclosed within dotted lines to indicate that these elements may comprise elements commonly found in existing automatic phonographs. Thus, a phonograph of the automatic type is provided with a phonograph turntable and motor 21 which cooperates with a phonograph pick-up 22, illustrated herein as being of the piezo crystal type, which is connected through a suitable control network comprising the resistors 23, 24 and 25 to an amplifier 26 which in turn is connected to the sound reproducer 27. The connection between the resistors 23 and 24 is opened so as to permit the insertion of a single-pole double throw switch 28 which, when thrown to the right-hand position, places the phonograph reproducing apparatus in operation for normal operation as an automatic phonograph exclusively. The switch 28 is mechanically connected to a switch 29 which is also a single-pole double throw switch and which is connected between a coin chute or switch 31 and an accumulator 32 which is connected to be energized from a transformer 33 which in turn is connected to a suitable source of power 34. When the switch 29 is thrown to the right, the coin chute or switch 31 operates to actuate the accumulator magnet 32 a number of times corresponding to the value of the coin or coins received by the coin chute or switch 31. This accumulator and the automatic phonograph may be of the type shown and illustrated in the United States Letters Patent No. 2,159,834 granted May 23, 1939, upon the application of Paul H. Smyth, Jr., and which is assigned to the same assignee as the present application.

When the switches 28 and 29 are thrown to the left as shown in Fig. 1, the automatic phonograph is connected to become a part of the system comprising our invention whereby the phonograph is provided with a microphone 35 which may be connected through a suitable amplifier 36 to a transformer 37, the output of which is normally connected through switch contacts 38 and 39 to one side of a transformer 41 which in turn is connected to a telephone line 42 leading to a central station. The other side of the output of the transformer 37 is connected through a balancing network comprising a capacitor 43, a resistor 44, an adjustable resistor 45, and a pair of contacts 46 to the other side of the transformer 41. By this means the subscriber may communicate with the operator at the central station. In order to signal the central station the subscriber inserts a coin or coins in the coin chute 31 which, in the present instance, as illustrated, is connected between a capacitor 48 and a relay 49. The transformer 33 is serially connected to a rectifier 47 which may comprise a pair of vacuum tube rectifier elements or any other suitable rectifier means. The transformer 33 and the rectifier 47 are connected to a capacitor 48 which is serially connected with the relay 49 so that the rectifier 47, energized from power received through the transformer 35 operates to supply uni-directional current to the capacitor 48 thereby to store energy there in to the serially connected capacitor 48 and relay coil 49 in turn are connected through the switch 29 to the coin chute or switch 31.

Whenever the coin-operated switch 31 is closed by insertion of a coin, a circuit is completed from one side of the capacitor 48 through the relay coil 49, the switch 29 and the coin-operated switch 31 to the other side of the capacitor 48. The relay coil 49 is provided with a copper disk or slug 51 in a manner similar to the construction used in alternating current relays, and henceforth, for convenience, this relay coil 49, the copper slug 51 and the switches controlled thereby will be referred to as an alternating current relay. The energization of the relay coil 49 by current supplied from the capacitor 48 is such as to provide positive operation of the contacts controlled by the relay coil 49, since the discharge of the energy stored in the capacitor 48 produces a very strong magnetic pull, thereby insuring positive operation of the switch contacts of this relay. The transformer 33 which supplies power to the rectifier 47 is preferably one which supplies a low voltage so that the capacitor 48 is charged to a relatively low voltage. The rectifier circuit comprising the valves 47 and transformer 33 has a regulation characteristic such that the current supplied thereby has a definite maximum limit. Thus, whenever the relay 49 is initially energized, the voltage appearing across the capacity 48 is initially relatively high because the no-load voltage of the rectifier circuit is also high, yet during further discharge of the capacitor 48 no large uni-directional current impulses are supplied by the rectifier 47 because the characteristic of the rectifier circuit to supply a limited amount of current. The operation of the relay 49 causes the switch contacts 39 and 46 to be broken and further causes the contacts 53 and 54 to be closed thereby connecting alternating current from a transformer 55 energized from a suitable source such as 34, to the transformer 41 through alternating current filter means 56 and 57 which may comprise, as illustrated, choke coils designed to permit low frequency alternating current to pass therethrough having a frequency corresponding to a frequency supplied by the isolation transformer 55 from a source of current 34. Thus, each time that the coin-operated switch 31 is closed by a coin or a plurality of coins or a number of times corresponding to the value of a coin, the alternating current relay 49 disconnects the remaining phonograph apparatus from the telephone line 42 and connects the telephone line 42 through the transformer 41, through the alternating current filter means 56, 57 to the alternating current source 55 thereby to transmit alternating current impulses to the central station which impulses correspond in number to the value of the coins inserted in the coin chute or switch 31.

Whenever alternating current supplied from the transformer 55 is connected to be transmitted from the subscriber station to the central station over the telephone line 42 by operation of the relay 49, another relay coil 50 is energized to open the circuit contacts 38. The coil 50 is connected to one of each of the terminals of the alternating current filter means 56 and 57 so as to be energized whenever alternating current flows through these filter means. The operation of the relay 50 in opening the contacts 38 is a feature which positively insures the disconnection of the sound reproducing apparatus including the sound reproducer 27 from the telephone line 42 since the contacts 38 are connected in series with the contacts 39 and one portion of the secondary winding of the transformer 37. Thus, if there is any delay in the operation of the alternating current relay 49, the relay 50 prevents the phonograph reproducing apparatus at the subscriber station from being connected to the telephone line until all flow of alternating current over the telephone line has ceased. As will be apparent to those skilled in the art, the safety and the positive operation of the apparatus controlled by the combination of the relays 49 and 50 has many advantages both from the standpoint of the elimination of noise from the apparatus of the subscriber as well as protection for the apparatus. The isolation transformer 55 is preferably of a one to one ratio so as supply relatively high alternating current potential to the telephone line 42 whenever a coin impulse is to be transmitted. While this voltage at the subscriber station may be equal to the voltage at the source 34, the telephone line 42 introduces an appreciable voltage drop so that at the central station the alternating current voltage is considerable less.

Upon signaling the operator by means of the coin-operated switch 31, the subscriber communicates with the operator by means of the microphone 35 and amplifier 36 to inform the operator what selection or selections are desired. These selections are placed upon suitable means for electrically reproducing phonograph records and the energy is transmitted from the central station through the telephone line 42 to the subscriber station which is provided with means interconnecting the telephone line 42 with the sound reproducer 27 and the amplifier therefor 26. This means comprises the switch 28, a suitable transformer 58, an attenuator 59 which is connected between the midpoint of the secondary winding of the transformer 37 and the juncture between the switch contacts 46 and the balancing network comprising the capacitor 43, the resistor 44 and the adjustable resistor 45.

The balancing network comprising the capacitor 43, the fixed resistor 44 and the adjustable resistor 45 serves to permit the circuit to be balanced so as to prevent howl and feedback. The balancing network is so related to the secondary winding of the transformer 37, the attenuator 59 and the telephone line 42 so as to form a bridge circuit. When this bridge circuit is balanced, incoming signals are effective across the attenuator 59 so as to be reproduced by the sound reproducer 27. Signals produced by the microphone 35 are ineffective across the attenuator 59 of the balancing network, and are effectively fed to the telephone line 42 by means of the transformer 41. By proper adjustment of the resistor 45 of the balancing network, the operations just described can be obtained thereby eliminating such conditions as would be likely to cause howl or feedback.

At the central station the telephone line 42 is connected to certain apparatus including a transformer 61 which is connected to a coin impulse detector circuit comprising a capacitor 62 and a rectifier 63 which is connected to a reversely arranged rectifier 64, the other terminal of which is connected through a relay coil 65 to the juncture between a capacitor 62 and the rectifier 63. The coin impulse detector circuit comprising the secondary winding of the transformer 61, the capacitor 62 and the reversely connected rectifiers 63 and 64 is characterized by being sensitive to alternating current impulses of short duration irrespective of what portion or portions of alternating current cycles might be received. Thus the coin impulse detector circuit is sensitive to as little as a half cycle of alternating current and the relay coil 65 will be operated thereby to close the contacts 66 which are connected to supply energy from a suitable source 67 to a subscriber play indicator 68. The alternating current impulses received at the central station from the telephone line 42 by means of the transformer 61 are now at a relatively low voltage, for example from 30 to 20 per cent of the original impressed voltage value, yet are relatively high with reference to voltages of normal voice currents. The coin impulse detector circuit, while being sensitive to as little as one-half cycle of alternating current, generally is actuated by at least a full cycle of alternating current. Each portion of the full cycle is rectified, and hence, as will be apparent to those skilled in the art, the circuit arrangement is such that the effective uni-directional current voltage across the relay coil 65 is doubled thereby insuring positive operation of the relay. Thus the coin impulse detector circuit in effect differentiates quantitatively between signals of different intensity, the alternating current coin impulse signal being the only signals received which are above the required predetermined level necessary to cause operation of this circuit.

This subscriber play indicator indicates the value of the coin or coins deposited by the subscriber at the subscriber station and furthermore is provided with signal means for calling the operator. The central station is provided with a talk-listen switch 69 which has a pair of contacts 71 and 72 normally connected with the switch blades thereof so that the telephone line 42 is connected through the transformer 61, and an isolating and current limiting capacitor 73, to the output transformer 74 of the phonograph pick-up amplifier. The switch blades cooperating with the contacts 71 and 72 may be actuated by throwing the switch 69 to the left so as to complete a circuit through switch contacts 75 and 76 which are connected to a suitable headset or telephone receiver 77 whereby the operator may hear what is spoken into the microphone 35 at the subscriber station. The talk-listen switch is furthermore provided with a pair of normally open switch contacts 78 and 79 which are connected through a suitable amplifier 81 to a microphone 82 by means of which the operator is connected through a portion of the phonograph pick-up amplifier including the vacuum tube 83 and the output transformer 74, the switch contacts 71 and 72, through the isolating capacitor 73 to a telephone line 42, whereby the telephone operator's voice is reproduced through the amplifier 26 and the sound reproducer 27 located at the subscriber station.

The central station is furthermore provided with a phonograph turntable and motor 84 which cooperates with a phonograph pick-up 85 which has been shown as being of a piezo crystal type. The output of the phonograph pick-up 85 is connected through a suitable circuit comprising a resistor 86, a parallel connected capacitor 87, a capacitor 88 and an adjustable resistor 89 to the control grid of the vacuum tube amplifier 83. The other side of the phonograph pick-up 85 is connected to ground and also through a capacitor 91 to the other side of the adjustable resistor 89 which in turn is connected to a resistor 92 which is also connected to ground. The cathode of the vacuum tube 83 may be connected through a suitable resistor 93 to ground in order that the vacuum tube 83 may be utilized as part of the voice transmission channel for the central station operator. The output of the microphone amplifier is connected through the switch contacts 78 and 79 to a resistor 94 which is connected through to the control grid of the vacuum tube 83 and the other side of the amplifier 81 is connected to the cathode of the vacuum tube 83.

Since telephone lines have the characteristic of attenuating different frequencies by different amounts, it is desirable to provide some form of compensation so that the reproduction at the subscriber station will be reasonably faithful and satisfactory. This is accomplished by the circuit connected between the phonograph pick-up 85 and the electrodes of the amplifier tube 83. The parallel connected resistor 86 and capacitor 87 form a network which provides certain compensation for the middle range of frequencies to be transmitted. The capacitor 88 connected between the movable contact of the adjustable resistor 89 and one end thereof supplies compensation for the high frequency range. The capacitor 91 and the resistor 92 provide the necessary degree of combination for the lower or base range of frequencies. By means of this arrangement, the necessary compensation is introduced into the circuit ahead of the first amplifying means such as the tube 83 and directly in back of the phonograph pick-up 85.

From the previous description it will be apparent that a central station operator's voice is received by the microphone 82 and amplified by the amplifier 81 whereupon it is further amplified by the amplifier 83 prior to transmission to a subscriber station. While this arrangement has obviously the advantage of reducing the amount of equipment required, it has the further advantage of permitting the central station operator's voice to be mixed with the music whenever a phonograph record is being reproduced by the means of the phonograph turntable 84 and the pick-up 85. In the subscriber station the voice of the central station operator is predominant since, by means of the cathode resistor 93, the amplification of the energy received from the phonograph pick-up 85 is subordinated to the amplification of the central station operator's voice currents.

Assuming that the amplifier 83 is transmitting energy from a phonograph record, and the central station operator wishes to talk to the subscriber station, the switch 69 is thrown to the right thus causing the switch contacts 79 to connect the grid of the amplifier tube 83 to ground through the resistor 94. This reduces the amplification of the phonograph currents by a predetermined amount. At the same time the switch contacts 78 connect one side of the amplifier 81 to the cathode side of the cathode resistor 93 of the vacuum tube 83. Since one side of the amplifier 81 is grounded, and the other side of the resistor 93 is grounded, voice energy of the central station operator received by the microphone 82 and amplified by the amplifier 81 is impressed across the cathode resistor of the vacuum tube amplifier 83 thereby causing the central station operator's voice to predominate over the music received at the subscriber station.

Figure 2:
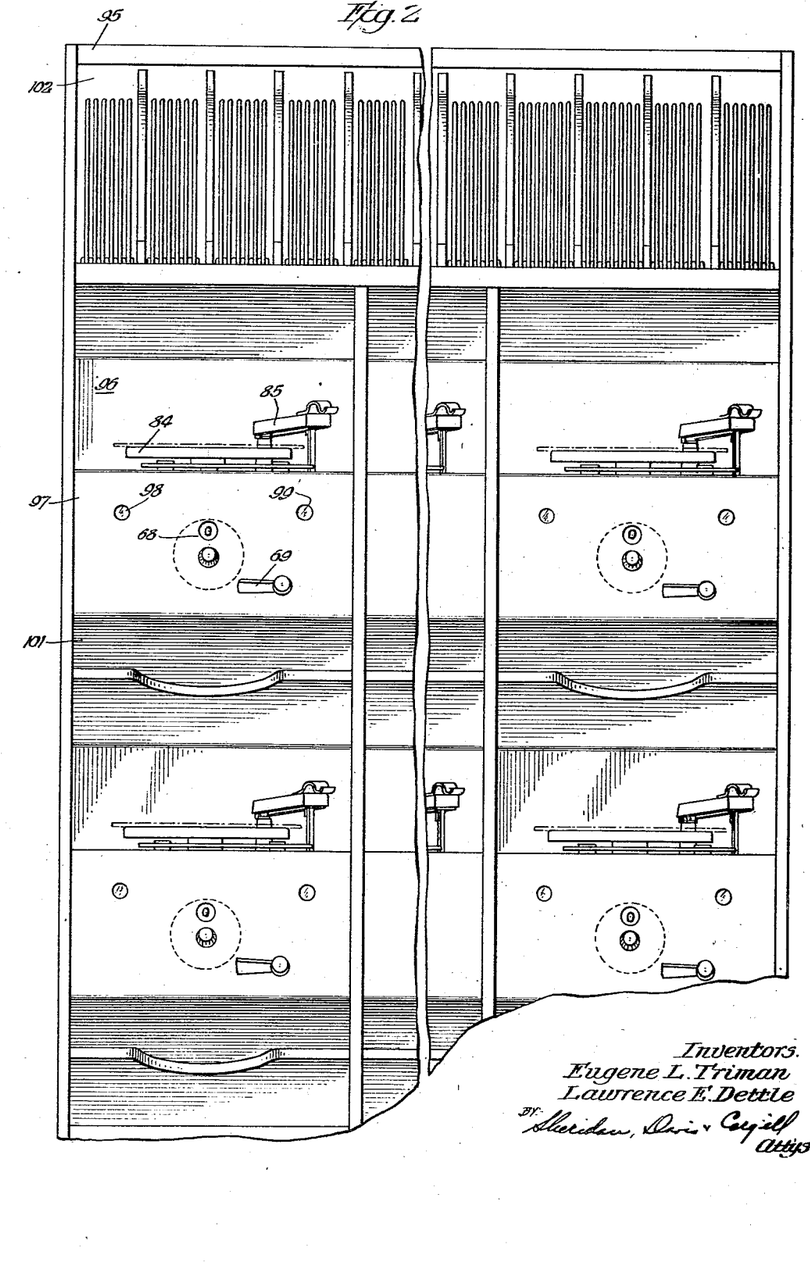
Fig. 2 illustrates the arrangement of said equipment at the central station.

While the circuit arrangement shown includes only the apparatus utilized between a single subscriber and the central station, it of course, is to be understood that any number of similar units may be provided for any desired number of subscribers. Thus the central station may be provided with a plurality of units such as has been illustrated in Fig. 2 wherein a suitable cabinet 95 houses a plurality of units each comprising a recess 96 for housing a turntable and phonograph pick-up such as 84 and 85, a control panel 97 upon which is mounted the talk-listen switch 69, the subscriber play indicator 68 and signal lights 98 and 99, and a record storage recess 101. The cabinet 95 is preferably further provided with a series of record storage units 102 wherein the records are permanently stored in proper order and classification so as to be readily available whenever any subscriber requests a particular record. The record storage recess 101 is utilized to house a number of records whenever a subscriber has requested the playing of a plurality of records.

Figure 3:
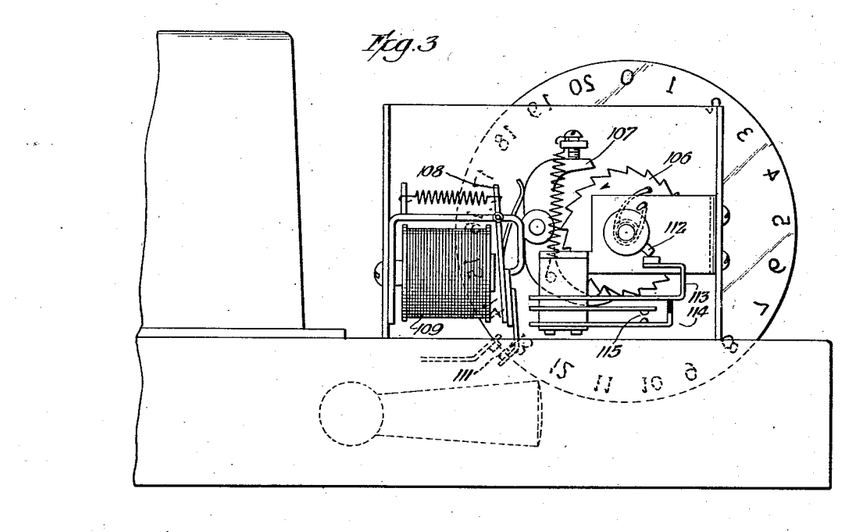
Fig. 3 and Fig. 4 are front and top views respectively of the subscriber play indicator located at the central station.
Figure 4:
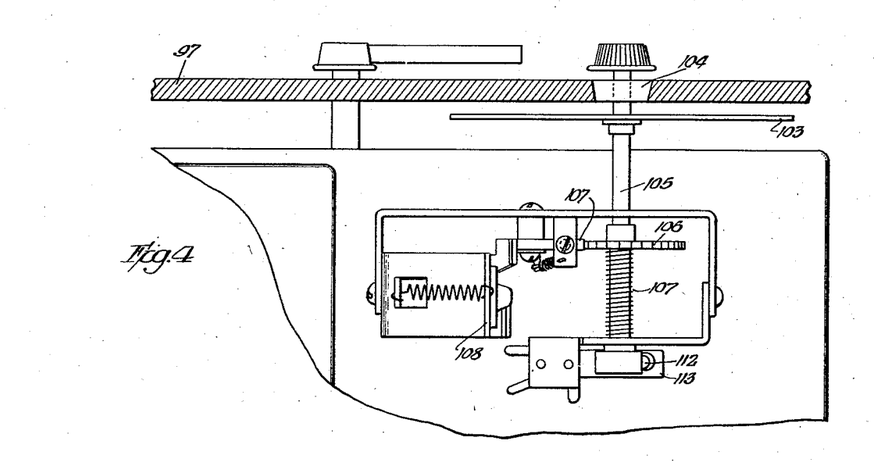

The subscriber play indicator 68, which is mounted on the panel 97 as will be apparent by reference to Figs. 3 and 4, comprises an indicator wheel 103 having indicia thereon visible through a suitable opening 104 in the panel thereof 97. The indicator dial 103 is mounted upon a shaft 105 which is provided with a ratchet wheel 106 which in turn is spring biased by a suitable helical spring 107 so as to tend to turn the shaft 105 in a clockwise direction shown in Fig. 3. The ratchet wheel 106 is controlled by an escapement which is controlled by an armature 108 actuated by a magnet coil 109. The magnet coil 109 is connected in circuit with a source of energy 67 and the switch contacts 66 of the relay 65 shown in Fig. 1. The armature 108 may be provided with one of a pair of contacts 111 which may be connected so as to operate a total station play indicator or mechanism. Whenever the relay 109 is energized, the armature 108 is attracted thereby actuating the escapement 107 so as to permit the shaft 105 to be rotated the distance equal to one tooth of the ratchet wheel 106. Whenever this occurs, rotation of the shaft 105 removes a stud 112 mounted on the shaft 105 from engagement with and out of contact with a switch blade 113, which normally is connected to one side of the phonograph pick-up as may be seen by reference to Fig. 5. The actuation of the switch blade 113 also permits the switch blade 114 to be actuated thereby closing a pair of contacts 115 which contacts are connected to control the energization of a suitable signal light 116 from a source of power 117.

Referring more particularly to Fig. 5, it will be seen that the subscriber play indicator 68 is represented by a dotted rectangle enclosing the magnet coil 102, and the shaft stud 112, the switch blade 113, the switch blade 114 and the switch contact 115. The switch blade 113 is connected to the juncture point between the phonograph pick-up 85, and the resistor 86 and the capacitor 87. The stud 112 of the shaft 105 is normally at ground potential so that whenever the stud 112 engages the switch blade 113 the output of the phonograph pick-up 85 is effectively shunted and hence is rendered ineffective. The switch blade 114 and the switch contact 115 are connected through the signal lamp 116 to the source of power 117. The source of power 117 is further connected to a signal lamp 118 controlled by a pair of normally open contacts 119 arranged to be actuated in accordance with the movement of the phonograph pick-up arm 85. The phonograph motor 84 is arranged to be energized from a source of power 121 by means of a pair of contacts 122 which are also arranged to be closed upon movement of the phonograph pick-up arm 85 from a position of rest with respect to the phonograph turntable. The phonograph pick-up 85 is furthermore arranged to be maintained in ineffective condition by a pair of contacts 123 which are connected between ground and the common juncture between the phonograph pick-up 85 and the resistor 86 and the capacitor 87. These contacts 123 are actuated by suitable means responsive to the movement of the phonograph pick-up from a position of rest, and as will subsequently become apparent, will furthermore be actuated whenever the phonograph pick-up reaches the end of a phonograph record.

By referring to Figs. 1 to 5 the operation of the system will now become apparent by reference to the following description. Whenever a subscriber inserts a coin or coins in the coin-operated switch 31 a circuit is completed through a relay 49 and a capacitor 48 thereby causing the relay 49 to operate. The capacitor 48 has previously been charged by unidirectional current supplied from a suitable source such as the half wave rectifier 47 and the alternating current transformer 33. In order that the relay coil 49 might not be affected by half-wave or uni-directional current impulses being supplied by the rectifier 47, the relay coil 49 is provided with a non-ferrous element such as a copper disk or ring 51. The surge of current supplied by the capacitor 48 is such as to produce a very strong initial pull upon the magnet coil 49 so as to insure positive operation of the relay contacts 53 and 54 thereby insuring transmission of an alternating current impulse over the telephone line 42 to the coin impulse detector circuit comprising the capacitor 62 and the connected rectifier elements 63 and 64. During the transmission of these alternating current impulses the relay 50 opened the switch contacts 38 thereby insuring that no alternating current affected the remainder of the apparatus. The coin detector circuit, responding to the alternating current impulse received at the central station over the telephone line 42 from the subscriber, closes the contacts 66 actuated by the relay coil or magnet 65 thereby supplying energy from a source 67 to actuate the magnet coil 109 of the subscriber play indicator. Since the initial impulse received by the detector circuit removes the stud 112 of the shaft 105 from engagement with the switch blade 113 thereby permitting the switch blade 114 to engage the contact 115, the signal light 116 becomes lighted calling the attention of the operator. The operator then throws the talk-listen switch 69 to the right thereby closing a circuit from the microphone 82, the amplifier 81, the switch contacts 78 and 79 through the resistor 94 and the vacuum tube 83, the output transformer 74 thereof, the contacts 71, 72 of the right-hand portion of the talk-listen switch, the isolating capacitor 73 and the isolating transformer 61 to the telephone line 42. The operator thereupon inquires as to what phonograph record or records are desired. The operator's voice currents are transmitted over the telephone line 42 to the subscriber station through the transformer 41, the contacts 39 and 46, the contact 38 through a portion of the secondary winding of the transformer 37, the attenuator 59, the transformer 58 through resistors 24 and 25, and the amplifier 26 to actuate the sound reproducer 27. The subscriber thereupon, by means of the microphone 35, the amplifier 36, the transformer 37, the balancing network comprising the elements 43 to 45, the switch contacts 38, 39 and 46, the transformer 41 and the telephone line 42 communicates with the central station operator. The voice currents received from the subscriber station over the telephone line 42 at the central station are transmitted through the transformer 61, the isolating capacitor 73, the switch blades at the left of the talk-listen switch 69, which by this time have been connected with the contacts 75 and 76 leading to the head-set 77 of the central station operator.

The central station operator, having made a record of the phonograph records desired, selects them from the phonograph magazine or library 102 and places them in the phonograph record recess 101 corresponding to that particular subscriber. One of these records is thereupon placed on the turntable 84, and the phonograph pick-up 85 is removed from the position of rest to the beginning of a phonograph record. The phonograph record actuates the stylus of a phonograph pick-up 85 which is connected through a suitable network comprising the resistor and capacitor elements 86, 87, 88, 89 and 91, the amplifier 83, the transformer 74, the switch contacts 71 and 72, the isolating capacitor 73, and the transformer 61, to the telephone line 42. At the subscriber station the telephone line 42 is connected through the transformer 41 to the contacts 39 and 46 which in turn are connected through the contacts 38 through a portion of the transformer 37, the attenuator 59, the transformer 58, the resistors 24 and 25, the amplifier 26, to the sound reproducer 27. Whenever the phonograph record has been completed, the switch contacts 119 of Fig. 5 are closed thereby energizing the signal light 118 indicating to the central station operator that the next record is to be played. When all of the records selected by the subscriber have been played, the indicator dial 103 of the subscriber play indicator 68 is returned to zero by the central station operator who rotates the shaft 105 by means of a suitable knob secured thereto.

Figures 6, 9:
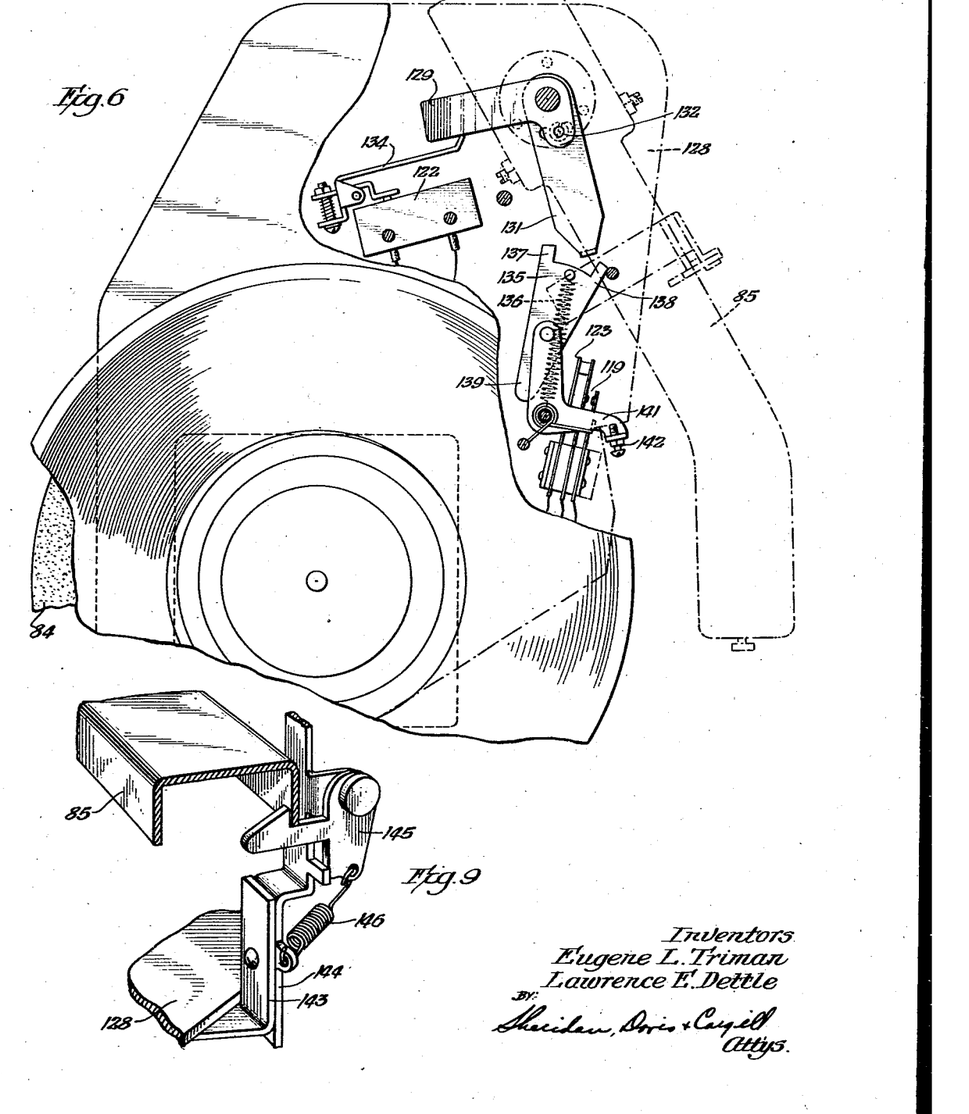
Fig. 6 and Fig. 7 illustrate the arrangement and operation of certain switches controlled by the member of the phonograph pick-up.
Fig. 9 is a perspective view showing means for maintaining the phonograph pick-up in a position of rest.
Figure 7:
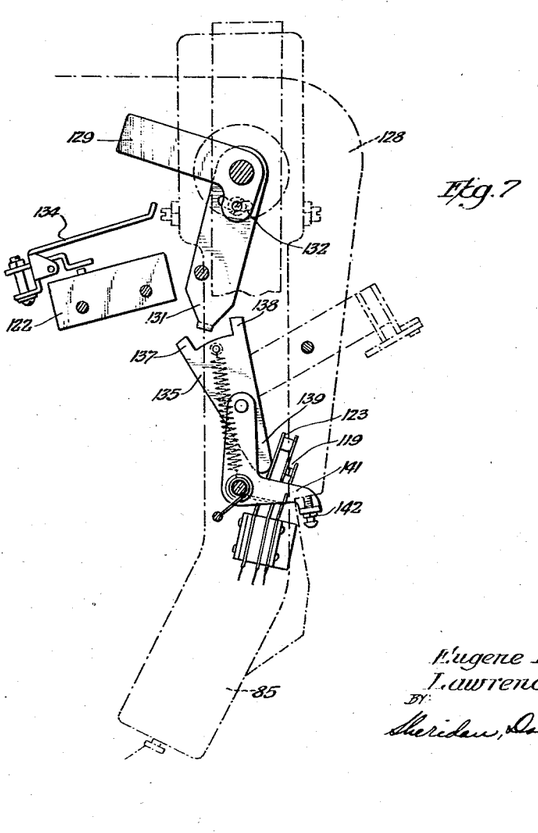
Figure 8:
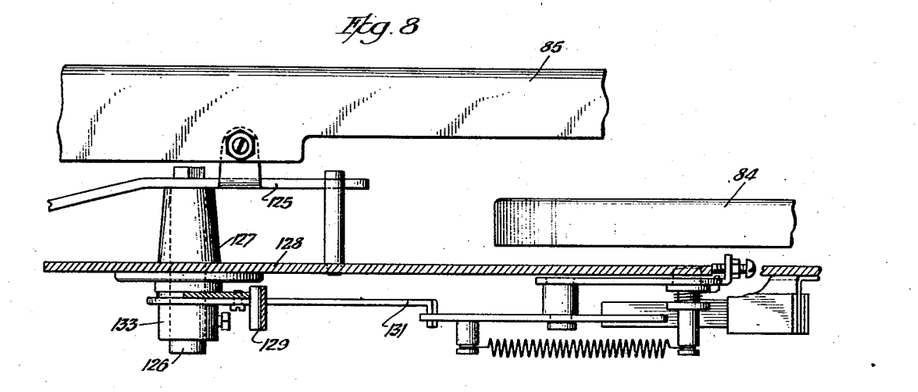
Fig. 8 is a view showing certain mechanical details of the switch actuating means shown in Figs. 6 and 7.
Figure 10:
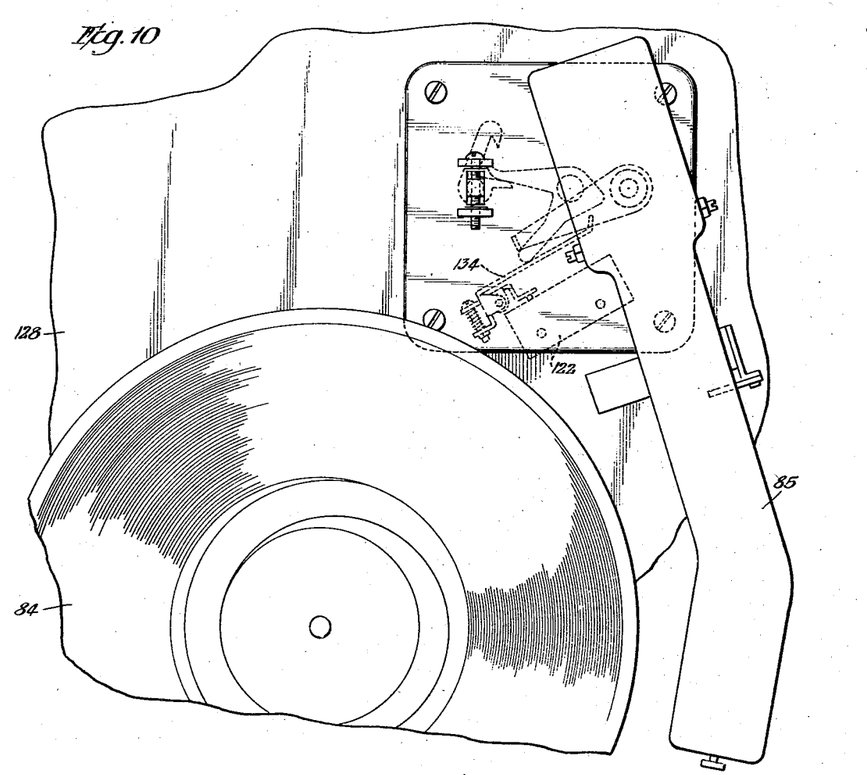
Fig. 10 illustrates another switch arrangement which may be actuated by the phonograph pick-up.
Figure 11:
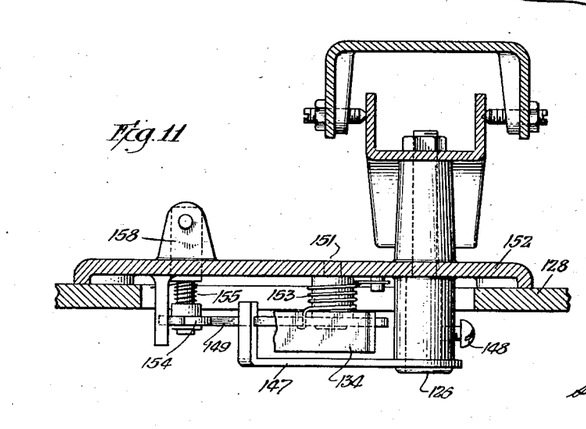
Fig. 11 and Fig. 12 illustrate certain details of the apparatus shown in Fig. 10.

By reference to Figs. 6, 7 and 8, it will be seen how the phonograph pick-up 85 is provided with means responsive to its movement for controlling the operation of such switches as the signal switch 119, the motor control switch 122, and the phonograph pick-up switch 123. The phonograph pick-up 85 is supported upon a member 125 which is secured to a shaft 126 mounted within suitable supporting means 127. The supporting means 127 is secured to a panel or base 128 which in turn supports numerous other elements including the phonograph turntable 84. The shaft 126 extends through the supporting housing 127 to some distance beneath the panel or mounting plate 128. A pair of actuating members or arms 129 and 131 are arranged to be adjustable with respect to each other and with respect to the shaft 126. These actuating members 129 and 131 may be secured in position with respect to each other by means of a suitable bolt and slot arrangement 132, and may be secured in position with respect to the shaft 126 by means of a suitable locking collar 133. The switch 122 which controls the operation of the phonograph turntable motor is of the spring-biased type which normally is in closed position, and hence the switch is provided with an operating arm 134 by means of which this bias is overcome so as to open the circuit of the switch 122. In the parked position of the pick-up 85 the actuating arm 129 secured thereto is in contact with the switch arm 134 of the electric switch 122 thereby opening the circuit of the switch. As soon as the phonograph pick-up 85 is moved from its parked position to the edge of a phonograph record, the switch 122 is closed and the phonograph turntable motor is energized.

In Fig. 5 there was shown a pair of switches 119 and 123 which were operated in response to movement of the phonograph pick-up 85. In the arrangement shown in Fig. 6 the switch 119 is biased so as to be normally open circuit. The switch 123 is shown as comprising a single switch blade which is connected to the juncture between the phonograph pick-up 85 and the input of the phonograph pick-up amplifier. An over-center biased switch operating member 135 is normally at ground potential, and whenever this operating member engages the switch blade 123, the phonograph pick-up is rendered ineffective.

The over-center actuating member 135 is spring biased by means of a suitable spring 136 and is provided with a pair of operating portions 137 and 138 adjacent one extremity thereof. The other extremity 139 of the actuating member is arranged to engage the switch blade 123. The operating members 137 and 138 are arranged to be engaged with the extremity of a phonograph pick-up operating lever 131 at a time when the phonograph pick-up 85 has left the end of the phonograph record. This position of the operating elements is shown in Fig. 7 since the extremity of the member has engaged the operating portion 137 of the over-center switch actuating means 135. When the central station operator returns the phonograph pick-up 85 to the parked position, the extremity of the operating member 131 will engage the actuating portion 138 of the over-center switch actuating member 135 thereby restoring the switch to the position shown in Fig. 6. In order that the operation of the switch actuating means 135 might bear the proper relation to the position of the phonograph pick-up 85 relative to a phonograph record on the turntable 84, the actuating member 135 is supported from a spring biased bell-crank support 141 which, at one extremity is provided with an adjustment set screw 142 bearing against a portion of the mounting plate 128. Thus, it is possible by utilizing this adjustment of the switch actuating means 135 and the adjustable portions of the switch actuating arms 129 and 131 relative to each other and relative to the phonograph pick-up 85 to produce the proper operation of each of the switches in accordance with the phonograph pick-up 85 relative to the phonograph turntable 84.

In order to conveniently retain the phonograph pick-up 85 in a parked position, there may be provided, as shown in Fig. 9, a spring-biased latch arrangement supported from the mounting plate or panel 128 by means of a member 143 which supports a structure 144 upon which there is provided a catch 145 which is suitably biased by a spring 146. The catch 145 engages the under side of the channel portion of the phonograph pick-up arm 85 whenever the arm is returned to parked position. In order to remove the arm from this position, the pick-up is raised sufficiently to permit the arm to clear the catch portion of the member 145.

Another arrangement of operating means and switch members is shown in Figs. 10 to 16. In the arrangement herein shown, switches have been given the same reference characters as were applied in previous disclosures. The phonograph turntable motor switch 122 is of the same type as utilized in the previous embodiment and is provided with an operating member 134. The phonograph pick-up 85 mounted upon the shaft 126 is provided in this instance with a single switch arm 147 adjustably secured to the shaft 126 by any convenient means such as a set-screw 148. The switches 119 and 123 and the motor switch 122 are actuated by a switch actuating member 149 which is supported from a suitable stud member 151 which may be mounted upon a plate 152 supported above the panel 128. The switch actuating member 149 is biased by a spring 153 in a direction so as to tend normally to open the motor switch 122 and to close the switches 123 and 119. It will be noted that the switch actuating member 149 in the present arrangement is to be maintained at ground potential so as to cooperate with the switch blade 123 in the same manner as would the switch actuating member 135 shown in Fig. 6.

Figure 12:
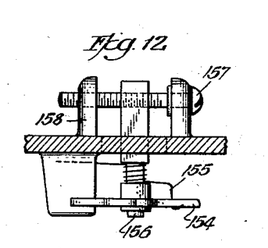
Figure 13:
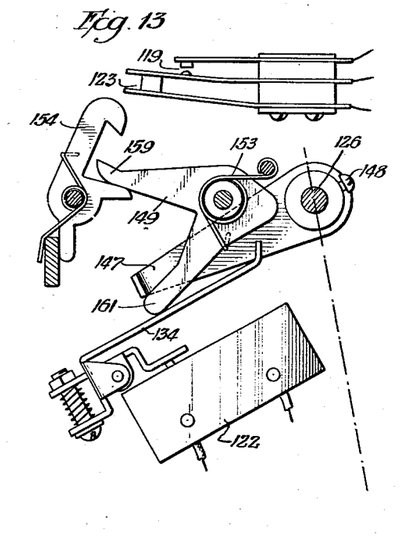
Figs. 13 to 16 illustrate the operation of the switch actuating means shown in Fig. 10.

In Fig. 12 there is shown a catch 154 suitably biased by a spring 155 and supported from a member 156 which in turn is mounted upon a threaded member 157 supported by suitable posts such as 158 which may be a portion of the mounting member 152. This arrangement permits a certain latitude of adjustment of the position of the catch 154. By referring to Fig. 13 it will be seen that the catch 154 is engaged by the arm 159 of the switch actuating member 149 when the phonograph pick-up 85 is in a position of rest. At the same time the arm 147 mounted on the phonograph pick-up 85 is in engagement with the arm portion 161 of the switch actuating member 149 so that this latter member is biasing the switch 122 to open circuit position.

Figure 14:
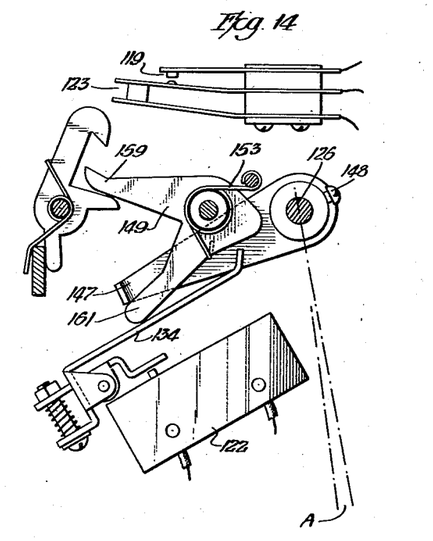

When the phonograph pick-up 85 is moved but a short distance from its parked position or position of rest as indicated by the small angle A, the arm 147 has been moved sufficiently to permit the spring-biased switch actuating member 149 to follow the movement of the arm 147 sufficiently to disengage the arm portion 161 from the switch arm 134 of the switch 122, thereby starting the phonograph turn-table. At the same time the lever portion 159 of the switch actuating member 149 has been moved so that it no longer engages the catch 154.

Figure 15:
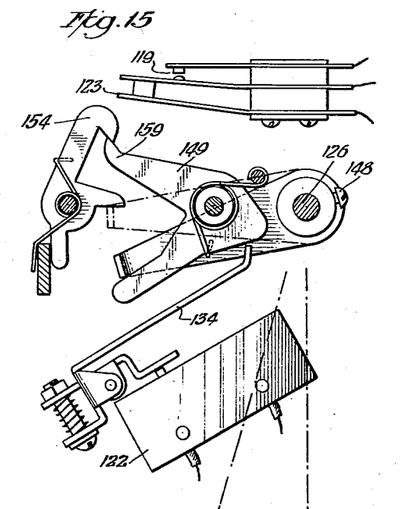
Figure 16:
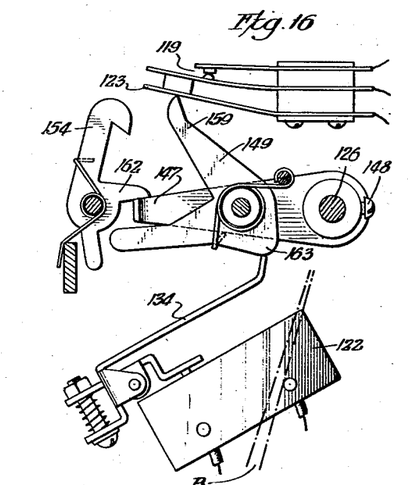

As the phonograph pick-up 85 moves across the phonograph record, the arm 147 continues to move in a counter-clockwise direction as may be seen from Fig. 15, and the spring-biased switch actuating member 149 continues to follow until the lever 159 thereof engages the forward portion of the catch 154. Further movement of the phonograph pick-up arm 85 from the solid line position shown in Fig. 15 up to the dotted line position produces no further movement of the switch actuating member 149. When the phonograph record has been completely reproduced and the stylus of the phonograph pick-up 85 has entered the shut-off or cut-off groove on the phonograph record, the arm will be moved through a small angle indicated at B in Fig. 16. At this time the arm 147 of the phonograph pick-up 85 engages a release portion 162 of the catch 154 thereby freeing the arm portion 159 of the spring biased switch operating member 149 so that the arm 159 engages the switch blade 123 thereby rendering ineffective the phonograph pick-up 85. At the same time the switch contacts 119 are closed thereby closing a circuit to a signal lamp such as 118 to inform the operator that the record has been reproduced. Simultaneously with the engagement of the switch arm 159 with the switch blade 123, a switch cam portion 163 on the operating member 149 engages the outer extremity of the switch arm 134 of the motor switch 122 thereby opening this switch to stop the phonograph turntable motor. When the central station operator lifts the phonograph pick-up 85 from the record and returns it to a position of rest, the switches are again returned to the position shown in Fig. 13.

Figure 17:
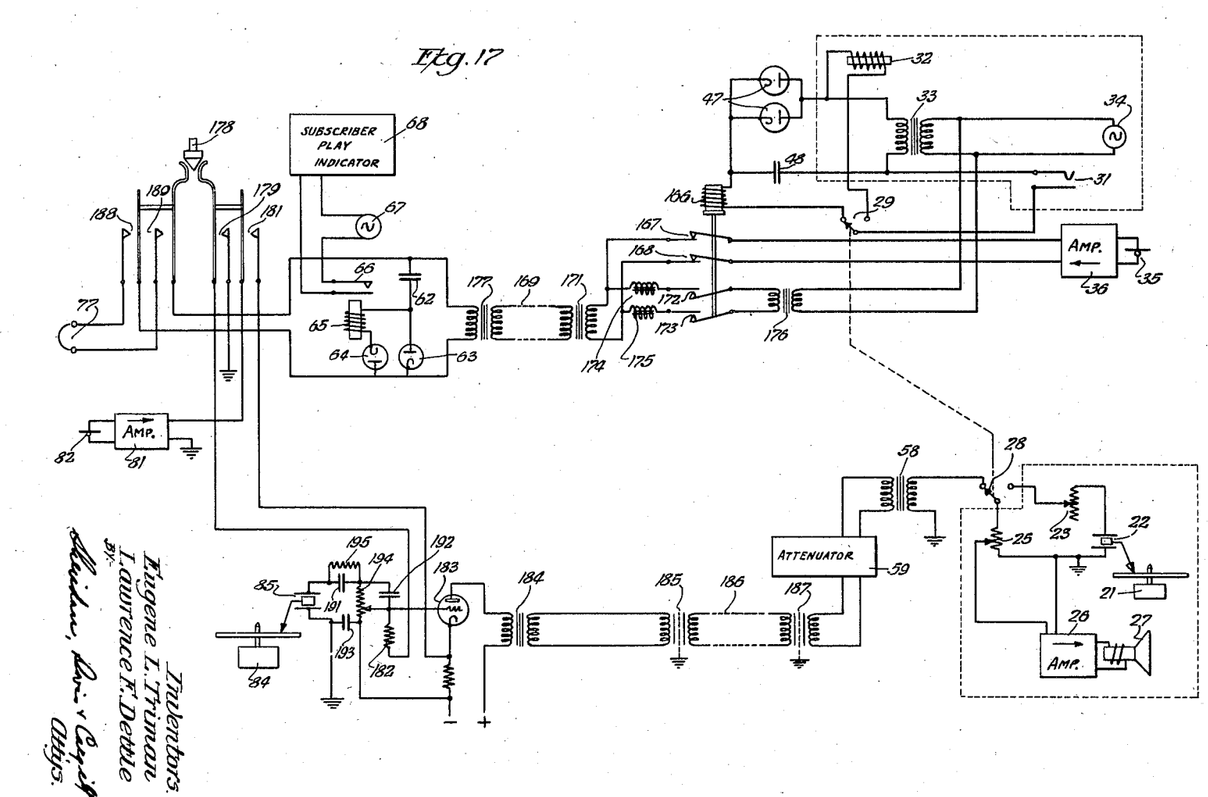
Fig. 17 shows a circuit arrangement embodying our invention as applied to a double channel system.

In Fig. 17 there is shown the application of the present invention to a system more generally referred to as a double channel system wherein one telephone line is utilized to transmit coin-operated impulses to the central station and to transmit voice currents to the central station. Another channel is used exclusively for the transmission of phonograph record currents from the central station to the subscriber station. For simplicity in disclosure and understanding of the present system, those portions of the circuit which are similar to the elements previously disclosed in connection with the single channel system of Fig. 1 have been given similar reference characters. In the arrangement shown in Fig. 17 there is provided a plurality of rectifier elements 47 and a transformer 33 comprising a source of uni-directional current having a relatively high impedance, or in other words, a limited current output characteristic, which is utilized to charge a capacitor 48. An alternating current relay switch 166 is connected so as to be energized by the capacitor 48 by means of the coin-operated switch 31. A microphone 35 connected through a suitable amplifier 36 is normally connected by means of the switch contacts 167 and 168 to a telephone line 169 by means of a transformer 171. The operation of the relay 166 is such as to open the contacts 167 and 168 thereby disconnecting the amplifier from the telephone line and to close the contacts 172 and 173 thereby connecting through suitable alternating current filter means 174, 175 alternating current potential to the transformer 171, which potential is obtained from a suitable transformer 176 which may be connected to the alternating current source 34. Thus, whenever the coin-operated switch 31 is actuated, the relay 166 serves to transmit alternating current impulses to the central station. These alternating current impulses are received at the central station by an impulse detector circuit comprising the capacitor 62 and the reversely connected rectifiers 63 and 64. These elements, which have been called a coin impulse detector circuit, are connected to control the relay 65 which when operated closes the contacts 66 which are connected in series with the source of potential 67 thereby to actuate a subscriber play indicator 68. The input to the detector circuit may comprise the secondary winding of a suitable transformer 177 connected to the telephone line 168. Whenever the operator has been signaled by the subscriber play indicator 68, a talk-listen switch 178 is actuated so as to connect the microphone 82 and its amplifier 81, by means of the switch contacts 179 and 181, to the cathode and through a resistor 182 to the control grid respectively of an amplifier tube 183. The amplifier tube 183 may be connected through suitable isolating transformers 184 and 185 to a telephone line 186 which is connected with a subscriber station. At the subscriber station the telephone line 186 may be connected through a suitable transformer 187 to an attenuator 59 which in turn is connected through a transformer 58 by means of a switch 28 to the input of the amplifier 26 which operates the sound reproducer 27. Upon inquiring as to what selection the subscriber desires, the central station operator, having actuated the switch 178 thereby closed the contacts 188 and 189 so as to connect the headphone 77 to the transformer 177 which in turn is connected to the telephone line 169. Upon receiving instructions from the subscriber, the switch 178 is returned to normal position and a phonograph record is placed upon the turntable 84 which is reproduced by the phonograph pick-up 85 which is connected to an input circuit comprising capacitors 191, 192 and 193 and resistors 194 and 195 which are connected to the input of the amplifier tube 183. While the present arrangement has shown the equipment of only one subscriber, it, of course, is to be understood that any number of similar units may be utilized depending upon the number of subscribers to the central station.

While we have shown our invention as applied to certain specific embodiments, it is to be understood that we do not wish to be limited thereto since it will be apparent that numerous changes may be made in the circuit arrangements and in the instruments employed without departing from the spirit and scope of the invention as set forth in the appended claims.

What we claim as new and desire to secure by Letters Patent of the United States is:

1. In a phonograph system for electrically reproducing phonograph records including a central station and a plurality of subscribers' stations connected thereto by telephone lines, means located at each subscriber station for transmitting a current impulse to said central station, said means including a source of low frequency pulsating current, an alternating current relay for connecting said source to said telephone line, a circuit for energizing said relay comprising a source of uni-directional current, a capacitor and a switch, said capacitor being connected in series with said relay and said switch, and said uni-directional current source being connected to charge said capacitor whereby said relay will be operated by current from said capacitor to insure positive operation of said relay.

2. In a phonograph system for electrically reproducing phonograph records including a central station and a plurality of subscribers' stations connected thereto by telephone lines, means located at each subscriber station for transmitting a current impulse to said central station, said means including a source of alternating current connected to a transformer having a low regulation characteristic, a rectifier connected to said transformer, a capacitor connected to be charged by said rectifier, a source of pulsating current, an alternating current relay for connecting said latter source to said telephone line, and a selectively operable switch connected in series with said relay and said capacitor whereby said relay may be operated positively by current supplied by said capacitor.

3. In a phonograph system for electrically reproducing phonograph records including a central station and a plurality of subscribers' stations connected thereto by telephone lines, coin-controlled means located at each subscriber station for transmitting current impulses to said central station in accordance with the value of the coins received thereby comprising a source of alternating current connected to a high impedance transformer, a rectifier connected to said transformer, a capacitor connected to be charged by said rectifier, a source of low frequency alternating current, alternating current filter means therefor, an alternating current relay for connecting said latter source to said telephone line through said filter means, and a coin-controlled switch connected in series with said relay and said capacitor whereby said relay will be operated positively by current supplied by said capacitor.

4. In a phonograph system for electrically reproducing phonograph records including a central station and a plurality of subscribers' stations connected thereto by telephone lines, means located at each subscriber station including communication apparatus normally connected to said central station by one of said telephone lines, coin-controlled means for transmitting to said central station current impulses in accordance with the value of coins received thereby, said means including a source of low frequency alternating current, alternating current filter means, a relay switch for disconnecting said telephone line from said apparatus and for connecting said telephone line to said source of alternating current through said filter means, and a relay operated in response to current flowing from said alternating current source to said telephone line for disconnecting said apparatus from said relay switch.

5. In a phonograph system for electrically reproducing phonograph records including a central station and a plurality of subscribers' stations connected thereto by telephone lines, means located at each subscriber station including communication apparatus for communicating with said central station and for reproducing sound, said apparatus being normally connected with said central station by one of said telephone lines, coin-controlled means for transmitting to said central station current impulses in accordance with the value of coins received thereby, said means including a source of low frequency alternating current, alternating current filter means therefor, a relay switch for disconnecting said telephone line from said apparatus and for connecting said telephone line to said source of alternating current through said filter means, a circuit for energizing the relay of said switch in accordance with the value of coins received by said coin-controlled means including a switch operated thereby, a capacitor connected in series with said relay of said switch and with said latter switch, a source of uni-directional current for charging said capacitor, and a relay operated in response to current flowing from said alternating current source to said telephone line for disconnecting said apparatus from said relay switch.

6. In a phonograph system for electrically reproducing phonograph records including a central station and a plurality of subscribers' stations connected thereto, coin-controlled means located in each subscriber station for transmitting alternating current impulses to said central station in accordance with the value of coins received thereby, a circuit located at said central station for receiving said current impulses including a capacitor and a rectifier connected across the input of said circuit, a second rectifier reversely connected with respect to said first rectifier and an output circuit connected between the remaining terminal of said second rectifier and the juncture between said first rectifier and said capacitor.

7. In a phonograph system for electrically reproducing phonograph records including a central station and a plurality of subscribers' stations connected thereto, coin-controlled means located at each subscriber station for transmitting alternating current impulses to said central station in accordance with the value of coins received thereby, a circuit located at said central station for receiving said alternating current impulses including a capacitor and a rectifier connected across the input of said circuit, a second rectifier reversely connected with respect to said first rectifier, an output circuit connected between the remaining terminal of said second rectifier and the juncture of said first rectifier and said capacitor, and means connected across said output circuit for indicating the value of coins received by said coin-controlled means at said subscriber station.

8. In a system for electrically reproducing phonograph records, the combination with a telephone circuit comprising means for transmitting over said circuit electrical currents of varying frequency corresponding to sound undulations; an impulse switch located at one end of said telephone circuit and adapted when momentarily closed to deliver to said telephone circuit an alternating current of higher potential than said first currents; and indicating means connected to the other end of said telephone circuits to receive both said electrical currents corresponding to sound undulations and said higher potential alternating current, said indicating means being differentially actuatable by said alternating current of higher potential.

9. In a phonograph system for electrically reproducing phonograph records, including a central station and a plurality of subscribers' stations connected thereto, phonograph reproducing apparatus comprising certain elements located at said central station and certain elements located at each subscriber station, coin-controlled means located at each subscriber station for transmitting alternating current impulses to said central station in accordance with the value of coins received thereby, a circuit located at said central station for receiving said current impulses including a capacitor and a rectifier serially connected across the input of said circuit, a second rectifier reversely connected with respect to said first rectifier, an output circuit connected between the remaining terminal of said second rectifier and the juncture between said first rectifier and said capacitor, and means connected across said output circuit for controlling the effectiveness of at least one of the phonograph reproducing elements located at said central station.

10. A system for electrically reproducing phonograph records comprising a central station and a plurality of subscribers' stations each connected thereto by a telephone circuit, a coin-operated switch located at each subscriber station, means responsive to actuation of said switch for transmitting to said central station an alternating current impulse of a certain voltage, means normally connected to one end of said telephone line for transmitting a voice communication from said subscriber station to said central station, means normally connected to said end of said telephone circuit for reproducing electrical energy corresponding to sound undulations received from said central station, means responsive to operation of said coin switch for disconnecting said latter two means from said telephone line during the transmission of said alternating current impulses, means for each subscriber located at said central station for receiving and indicating said alternating current impulses from said subscriber station, means for each subscriber normally connected to the central station end of said telephone circuit for transmitting to said subscriber station currents corresponding to phonograph records, and means selectively connectible to said end of said telephone circuit for voice communication with said subscriber station.

11. A system for electrically reproducing phonograph records comprising a central station and a plurality of subscribers' stations each connected thereto by a two wire telephone line, a coin-operated switch located at each subscriber station, means responsive to actuation of said switch for transmitting to said central station an alternating current impulse of a certain voltage, means normally connected to the end of said telephone line for transmitting a voice communication to said central station, means normally connected to said end of said telephone line for reproducing electrical energy corresponding to sound undulations received from said central station, means responsive to operation of said coin switch for disconnecting said latter two means from said telephone line during the transmission of said alternating current impulses, means for each subscriber located at said central station for receiving and indicating said alternating current impulses received from said subscriber station, said means being responsive to voltage exceeding a predetermined amount, means for each subscriber normally connected to said telephone line for transmitting to said subscriber station currents corresponding to phonograph record undulations, and means selectively connectible to said telephone line for voice communication with said subscriber station.

12. A system for electrically reproducing phonograph records comprising a central station and a plurality of subscribers' stations each connected thereto by a double channel telephone circuit, a coin-operated switch located at each subscriber station, means normally connected at said subscriber station to one channel of said circuit for transmitting a voice communication to said central station, means responsive to actuation of said switch for disconnecting said latter means and for transmitting to said central station alternating current impulses, means normally connected to the other of said channels for reproducing electrical energy corresponding to sound undulations received from said central station, means for each subscriber located at said central station for receiving and indicating said alternating current impulses, means for each subscriber normally connected at the central station to one channel for transmitting to said subscriber station currents corresponding to phonograph record undulations, and means selectively connectible to the other of said channels for voice communication with said subscriber station.

13. In a remote control phonograph record playing system of the character described for transmitting sound over a plurality of four conductor telephone circuits, the combination of: a plurality of separate location stations; means for operatively connecting each of said location stations to one end of a corresponding one of said telephone circuits; a central control station at the other end of said telephone circuits; a sound reproducing means, and means for connecting a microphone and said sound reproducing means selectively to said telephone circuits; a coin-operated switch at each location station for transmitting an electrical impulse of a predetermined voltage value over the circuit associated with this said station; an indicating means at said control station for each of said circuits responsive to voltage above a predetermined value for indicating the number of actuations of said coin-actuated switch by current flowing over the corresponding telephone circuit; and a plurality of record playing means at said central station corresponding in number to said location stations and respectively associated with them for transmitting over any particular circuit a number of records corresponding to the number of impulses received by said indicating means.

14. In a phonograph record playing system of the character described for use with a telephone circuit, the combination of; means connected to one end of said circuit at a subscriber's station for translating waves of varying frequency from an electrical conductor medium to an air medium, and an air medium to an electrical conductor medium; means at said subscriber's station for impressing on said one end of said circuit electrical impulses of a definite frequency and voltage; means at a central station at the other end of said circuit for translating waves of varying frequency from an electrical conductor medium to an air medium and from an air medium to an electrical conductor medium, means at said central station for differentially receiving and indicating said electric impulses of definite frequency and voltage; and means for reproducing a sound record at said central station, said means being connected to said other end of said circuit.

15. A system for electrically reproducing phonograph records comprising a central station and a plurality of subscribers' stations each connected thereto by a telephone line, a coin-operated switch located at each subscriber station, means normally connected to said telephone line at said subscriber station for receiving and for transmitting undulations corresponding to sound, means responsive to actuation of said switch for disconnecting said latter means and for transmitting to said central station an alternating current impulse of a certain voltage, means for each subscriber normally connected at the central station to said telephone line for transmitting to said subscriber station currents corresponding to sound undulations, and means connected to said end of said telephone line for receiving and indicating altternating current impulses received from said subscriber station, said means being quantitatively responsive to alternating current voltage impulses having a predetermined value.

16. The combination in a system of electrically reproducing phonograph records comprising a central station, a plurality of subscribers' stations each connected thereto by a telephone line, means for each subscriber for reproducing the phonograph records, certain elements thereof being located at said subscriber station and other elements thereof being located at said central station, said latter elements including a phonograph pick-up and an amplifier therefor, and a microphone for communicating with said subscriber station, said amplifier including a vacuum tube having a cathode resistor, a resistor adapted to be connected across the input of said amplifier, a selectively operable switch interconnecting said microphone, said resistor and said cathode resistor of said amplifier, and circuit connections whereby said switch upon operation will connect said resistor across the input of said amplifier and simultaneously connect the output of said microphone across said cathode resistor, 17. The combination in a system of electrically reproducing phonograph records comprising a central station, a plurality of subscribers' stations each connected thereto by a telephone line, means for each subscriber for reproducing the phonograph records, certain elements thereof being located at said subscriber station and other elements thereof being located at said central station, said latter elements including a phonograph pick-up and an amplifier therefor, and means for communicating with said subscriber station, said means being selectively connectible to said latter elements whereby simultaneously voice currents and phonograph sound currents may be transmitted, said means including a resistor connected across the input of said amplifier for reducing the magnitude of the phonograph sound currents to be transmitted.

18. The combination in a system for electrically reproducing phonograph records comprising a central station, a plurality of subscribers' stations each connected thereto by a telephone line, means for each subscriber having reproducing phonograph records, certain elements thereof being located at said central station and including a phonograph pick-up and an amplifier therefor, means for communicating with said subscriber station including a microphone, and means including a switch connected between said microphone and said amplifier so as to reduce the amplification of energy from said phonograph pick-up by a predetermined amount whenever said microphone is connected to said amplifier.

19. The combination in a system for electrically reproducing phonograph records comprising a central station, a plurality of subscribers' stations each connected thereto by a telephone line, means for each subscriber for reproducing phonograph records, certain elements thereof being located at said subscriber station and other elements thereof being located at said central station, said latter elements including a phonograph pick-up and an amplifier therefor, and a plurality of networks connected between said pick-up and said amplifier, each network operating over a different frequency range for compensating for the attenuation at frequencies in that range occurring in the transmission to said subscriber station of currents corresponding to sound undulations of a phonograph record.

20. The combination having a system for electrically reproducing phonograph records comprising a central station and at least one subscriber station connected thereto by a telephone line, means for each subscriber for reproducing phonograph records, certain elements thereof being located at said subscriber station and other elements thereof being located at said central station, and means located at said subscriber station for communicating with said central station, said means and said first elements being interconnected with each other and with said telephone line by a bridge circuit including means for balancing said circuit thereby to prevent feedback.

21. In a phonograph system for electrically reproducing phonograph records comprising a central station and a plurality of subscribers' stations connected thereto, means for each subscriber for electrically reproducing phonograph records, certain elements thereof being located at said central station and other elements thereof being located at each subscriber station, said elements at said central station including a phonograph turntable motor and a pick-up, a switch biased to closed position for controlling the operation of said motor, a snap action switch normally open for controlling the effectiveness of another of said elements, means operated by the movement of said pick-up for actuating said switches, said means having a period of free travel between said switches during the reproduction of a phonograph record, said means further operating at the end of a phonograph record to close said snap action switch.

22. In a phonograph system for electrically reproducing phonograph records comprising a central station and a plurality of subscribers' stations connected thereto, means for each subscriber for electrically reproducing phonograph records comprising certain elements located at said central station and other elements located at each subscriber station, said elements at said central station including a phonograph turntable motor and a pick-up, a switch biased to closed position for controlling the operation of said motor, a signal device, a snap action switch biased to open position for controlling the effectiveness of another of said elements and to energize said signal device, means operated by the movement of said pick-up for actuating said switches, said means operating to permit said first switch to be closed upon movement of said pick-up from a position of rest and to actuate said snap action switch, said means having a period of free travel during the reproduction of a phonograph record.

23. In a phonograph system for electrically reproducing phonograph records comprising a central station and a plurality of subscribers' stations connected thereto, means for each subscriber for electrically reproducing phonograph records comprising certain elements located at said central station and other elements located at each subscriber station, said elements at said central station including a phonograph turntable motor and pick-up, a switch biased to closed position for controlling the operation of said motor, a snap action switch biased to open position for controlling the effectiveness of another of said elements, means operated by the movement of said pick-up for actuating said switches, said means operating to permit said first switch to be closed and said snap action switch to be opened upon movement of said pick-up from a position of rest to the beginning of a phonograph record.

24. In a phonograph system for electrically reproducing phonograph records comprising a central station and a plurality of subscribers' stations connected thereto, means for each subscriber for electrically reproducing phonograph records, certain elements thereof being located at said central station and other elements thereof being located at said subscriber station, said elements at said central station including a phonograph turntable motor and a phonograph pick-up, a switch biased to closed position for controlling said motor, a second switch biased to open position for controlling the effectiveness of another of said elements at said central station, means operable by the movement of said phonograph pick-up for actuating said switches, said means comprising an arm mounted on said phonograph pick-up, a switch actuating member cooperating with said arm, said member being biased in a direction tending to close said second switch, said member having a motor switch operating arm, a motor switch cam surface and a switch lever for said second switch, a catch biased to engage said latter switch lever with said second switch, said catch being provided with a release surface arranged to be engaged by said arm upon completion of the playing of a phonograph record, thereby to provide a snap action operation of said second switch and of said motor switch, said cam surface of said actuating means engaging said motor switch concomitantly with the engagement of said lever with said second switch.

25. In a phonograph system for electrically reproducing phonograph records comprising a central station and a plurality of subscribers' stations connected thereto, means for each subscriber for electrically reproducing phonograph records, comprising certain elements located at said central station and other elements located at said subscriber station, said elements at said central station including a phonograph turntable motor, a phonograph pick-up, a switch biased to closed position for controlling the operation of said motor, a second switch biased to open position for controlling the effectiveness of said phonograph pick-up, and means operable by the movement of said pick-up for actuating said switches, said means comprising an arm adjustably mounted with respect to and on said phonograph pick-up, a switch actuating member cooperating with said arm, said member being biased in a direction tending to close said second switch, said member having a motor switch actuating arm, a motor switch cam surface and a switch lever for said second switch, a catch adjustably mounted with respect to said latter lever and biased to engage said latter lever to delay the engagement of said lever with said second switch, said catch being provided with a release surface arranged to be engaged by said arm upon completion of the reproduction of a phonograph record, thereby to provide a snap action operation of said switches, said cam surface of said actuating member engaging said motor switch concomitantly with the engagement of said lever with said second switch.

26. In a phonograph system for electrically reproducing phonograph records comprising a central station and a plurality of subscribers' stations connected thereto, means for each subscriber for electrically reproducing phonograph records, certain elements thereof being located at said central station and including a phonograph turntable motor, a phonograph pick-up, a switch biased to closed position for controlling the operation of said motor, a second switch biased to open position for controlling the effectiveness of one of the elements at said central station, said switch being provided with an over-center biased actuating member whereby to provide a snap action operation, and means operable by the movement of said pick-up for actuating said switches, said means comprising a pair of arms mounted on said pick-up in adjustable relation to each other and to said pick-up.

27. In a phonograph system for electrically reproducing phonograph records comprising a central station and a plurality of subscribers' stations connected thereto, means for each subscriber for electrically reproducing phonograph records comprising certain elements located at said central station and other elements located at said subscriber station, said elements at said central station including a phonograph turntable motor, a phonograph pick-up, a switch biased to closed position for controlling said phonograph motor, a second switch biased to open position to render effective another of said elements at said central station, said switch being provided with an over-center biased actuating member whereby to provide a snap action operation, and means operable by the movement of said pick-up for actuating said switches, said means comprising a pair of arms mounted on said phonograph pick-up in adjustable relation to each other and to said pick-up, said means operating to close said motor switch and to open said second switch whenever said pick-up is moved from a position of rest with respect to said turntable.

EUGENE L. TRIMAN.
LAWRENCE E. DETTLE.